United States Patent [19]

Parry et al.

[11] Patent Number: 4,746,500
[45] Date of Patent: May 24, 1988

[54] PNICTIDE TRAP FOR VACUUM SYSTEMS

[75] Inventors: Robert W. Parry, Salt Lake City, Utah; John A. Baumann, Ossining; Rozalie Schachter, Flushing, both of N.Y.

[73] Assignee: Stauffer Chemical Company, Westport, Conn.

[21] Appl. No.: 886,567

[22] Filed: Jul. 16, 1986

Related U.S. Application Data

[62] Division of Ser. No. 581,101, Feb. 17, 1984, Pat. No. 4,613,485.

[51] Int. Cl.⁴ .............................................. B01D 3/10
[52] U.S. Cl. ................................... 423/322; 423/210; 423/659
[58] Field of Search ..................... 423/210, 322, 659

[56] References Cited

U.S. PATENT DOCUMENTS 4,355,010 10/1982 Jödden et al. ..................... 423/210

OTHER PUBLICATIONS

Matvay, Reissue 25,858 issued 9-21-65.
Melville and Gray, The Polymerization of Phosphorus, Trans. Faraday Sa. 32,271 (1936), pp. 271-285.

*Primary Examiner*—John Doll
*Assistant Examiner*—Wayne A. Langel
*Attorney, Agent, or Firm*—F. Eugene Davis, IV; Mark P. Stone

[57] ABSTRACT

A fore line trap is located before the forepump in a vacuum system. The trap utilizes a cracker, which may be a heated filament or a plasma, and cold walls. The cracker cracks pnictide gas species such as $P_4$ into other species such as $P_2$ which have a higher sticking co-efficient. The pnictides are deposited on the cold walls. The cold walls preferably comprise a sleeve which may be removed from the trap and replaced by a clean one.

20 Claims, 3 Drawing Sheets

PNICTIDE TRAP FOR VACUUM SYSTEMS

This application is a division of application Ser. No. 581,101, filed 2/17/84, issued as U.S. Pat. No. 4,613,485, on Sept. 23, 1986.

RELATED APPLICATIONS

This application is related to the following co-pending applications, assigned to the same assignee as this application. These applications are incorporated herein by reference. U.S. patent application entitled CATENATED SEMICONDUCTOR MATERIALS OF PHOSPHORUS, METHODS AND APPARATUS FOR PREPARING AND DEVICES USING THEM, Ser. No. 335,706, filed Dec. 30, 1981, now abandoned; MONOCLINIC PHOSPHORUS FORMED FROM VAPOR IN THE PRESENCE OF AN ALKALI METAL, Ser. No. 419,537, filed Sept. 17, 1982, now U.S. Pat. No. 4,620,968, issued Nov. 4, 1986; CATENATED PHOSPHORUS MATERIALS, THEIR PREPARATION AND USE, AND SEMICONDUCTOR AND OTHER DEVICES EMPLOYING THEM, Ser. No. 442,208, filed Nov. 16, 1982, now U.S. Pat. No. 4,508,931, issued Apr. 2, 1985, which is a Continuation-in-Part of Ser. Nos. 335,706 and 419,537; VACUUM EVAPORATED FILMS OF CATENATED PHOSPHORUS MATERIAL, Ser. No. 509,159, filed June 29, 1983, now U.S. Pat. No. 4,596,721, issued June 24, 1986; GRAPHITE INTERCALATED ALKALI METAL VAPOR SOURCES, Ser. No. 509,157, filed June 29, 1983, now abandoned; SPUTTERED SEMICONDUCTING FILMS OF CATENATED PHOSPHORUS MATERIAL AND DEVICES FORMED THEREFROM, Ser. No. 509,175, filed June 29, 1983, now U.S. Pat. No. 4,509,066, issued Apr. 2, 1985; MIS DEVICES EMPLOYING ELEMENTAL PNICTIDE OR POLYPHOSPHIDE INSULATING LAYERS, Ser. No. 509,210, June 29, 1983, now U.S. Pat. No. 4,567,503, issued Jan. 28, 1986; and, LIQUID PHASE GROWTH OF CRYSTALLINE POLYPHOSPHIDE, Ser. No. 509,158, filed June 29, 1983, now U.S. Pat. No. 4,591,408, issued May 27, 1986; also, the applications of David G. Brock and John A. Baumann for THERMAL CRACKERS FOR FORMING PNICTIDE FILMS IN HIGH VACUUM PROCESSES Ser. No. 581,139 filed 2/17/84, now U.S. Pat. No. 4,649,024, issued Mar. 10, 1987; Diego J. Olego, John A. Baumann, Paul M. Raccah, Rozalie Schachter, Harvey B. Serreze and William E. Spicer for PASSIVATION AND INSULATION OF III-V DEVICES WITH PNICTIDES, PARTICULARLY AMORPHOUS PNICTIDES HAVING A LAYER-LIKE STRUCTURE Ser. No. 581,115 filed 2/17/84; Diego J. Olego for PNICTIDE BARRIERS IN QUANTUM WELL DEVICES Ser. No. 581,140 filed 2/17/84, now abandoned; Diego J. Olego for USE OF PNICTIDE FILMS FOR WAVEGUIDING IN OPTO-ELECTRONIC DEVICES Ser. No. 581,171 filed 2/17/84, now abandoned; Rozalie Schachter and Marcello Viscogliosi for VACUUM DEPOSITION PROCESSES EMPLOYING A CONTINUOUS PNICTIDE DELIVERY SYSTEM, PARTICULARLY SPUTTERING Ser. No. 581,103 filed 2/17/84; Mark A. Kuck and Susan W. Gersten for CONTINUOUS PNICTIDE SOURCE AND DELIVERY SYSTEM FOR FILM DEPOSITION, PARTICULARLY BY CHEMICAL VAPOR DEPOSITION Ser. No. 581,102 filed 2/17/84; Mark A. Kuck and Susan W. Gersten for METHOD OF PREPARING HIGH PURITY WHITE PHOSPHORUS Ser. No. 581,105 filed 2/17/84, now U.S. Pat. No. 4,618,345, issued Oct. 21, 1986; and, Mark A. Kuck, Susan W. Gersten, John A. Baumann and Paul M. Raccah for HIGH VACUUM DEPOSITION PROCESSES EMPLOYING A CONTINUOUS PNICTIDE DELIVERY SYSTEM Ser. No. 581,104 filed 2/17/84.

TECHNICAL FIELD

This invention relates to a pnictide trap for vacuum systems; and to pnictide crackers.

BACKGROUND ART

Phosphorus and other pnictides produce deleterious effects when passed through the forepumps of vacuum systems. They also collect on the walls and mechanisms in vacuum chambers and mechanisms periodically have to be disassembled for cleaning. Re-evaporation of pnictides also increase the background pressure of $Pnictide_4$ species which is undesirable in certain processes. An effective trapping system is needed.

DISCLOSURE OF THE INVENTION

A pnictide trap 38 according to the invention comprises a chilled cylindrical sleeve 20 (FIG. 2) and a heated filament 22 or a plasma, (such as that provided by a glow discharge) centrally located within the sleeve 20. $P_4$ species enters the sleeve 20 through opening 24 therein. $P_4$ is cracked to $P_2$ by the heated filament 22 which is heated preferably to above 1000° C. $P_2$ which has a high sticking coefficient is converted to a phosphorus film on the inner wall 26 of sleeve 20.

The sleeve 20 may be removed from the system by removing clamps 29. First the cover plate 28 and filament 22 are removed, and then the sleeve 20. It may be cleaned or replaced by a new clean sleeve.

The dpnictide trap 38 is shown in a vacuum line in FIG. 1. Another one 60 can also be located in the vacuum chamber 32 to reduce extraneous pnictide deposits therein.

OBJECTS OF THE INVENTION

It is therefore an object of the invention to provide a vacuum system trap.

Another object of the invention is to provide such a trap for pnictides.

Other objects of the invention will in part be obvious and will in part appear hereinafter.

The invention accordingly comprises the several steps and the relation of one or more such steps with respect to each of the others, and the apparatus embodying features of construction, selection of elements and arrangements of parts which are adapted to effect such steps, all as exemplified in the following detailed disclosure. The scope of the invention is indicated in the claims.

BRIEF DESCRIPTION OF THE DRAWINGS

For a fuller understanding of the nature and objects of the invention, reference should be made to the following detailed description taken in connection with the accompanying drawings in which.

The same reference characters refer to the same elements throughout the several views of the drawings.

BEST MODE FOR CARRYING OUT THE INVENTION

Figure 1:
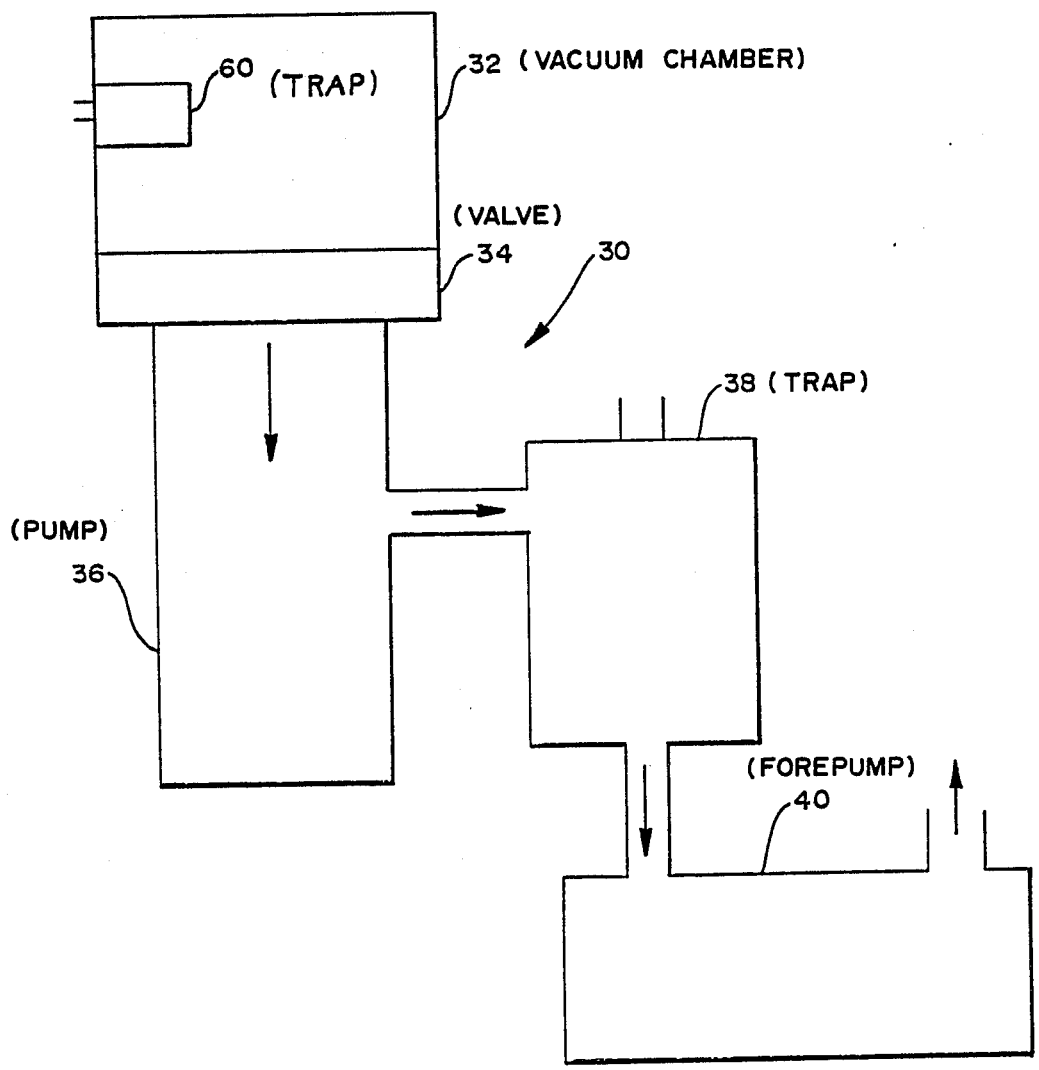
FIG. 1 is a diagram of a vacuum system employing a pnictide trap according to the invention.

Now, referring to FIG. 1, a vacuum system 30, according to the invention, comprises a vacuum chamber 32 and a high vacuum valve 34, diffusion pump 36, pnictide trap 38, and a mechanical forepump 40. Gases are exhausted from the vacuum system in the direction of the arrows.

Figure 2:
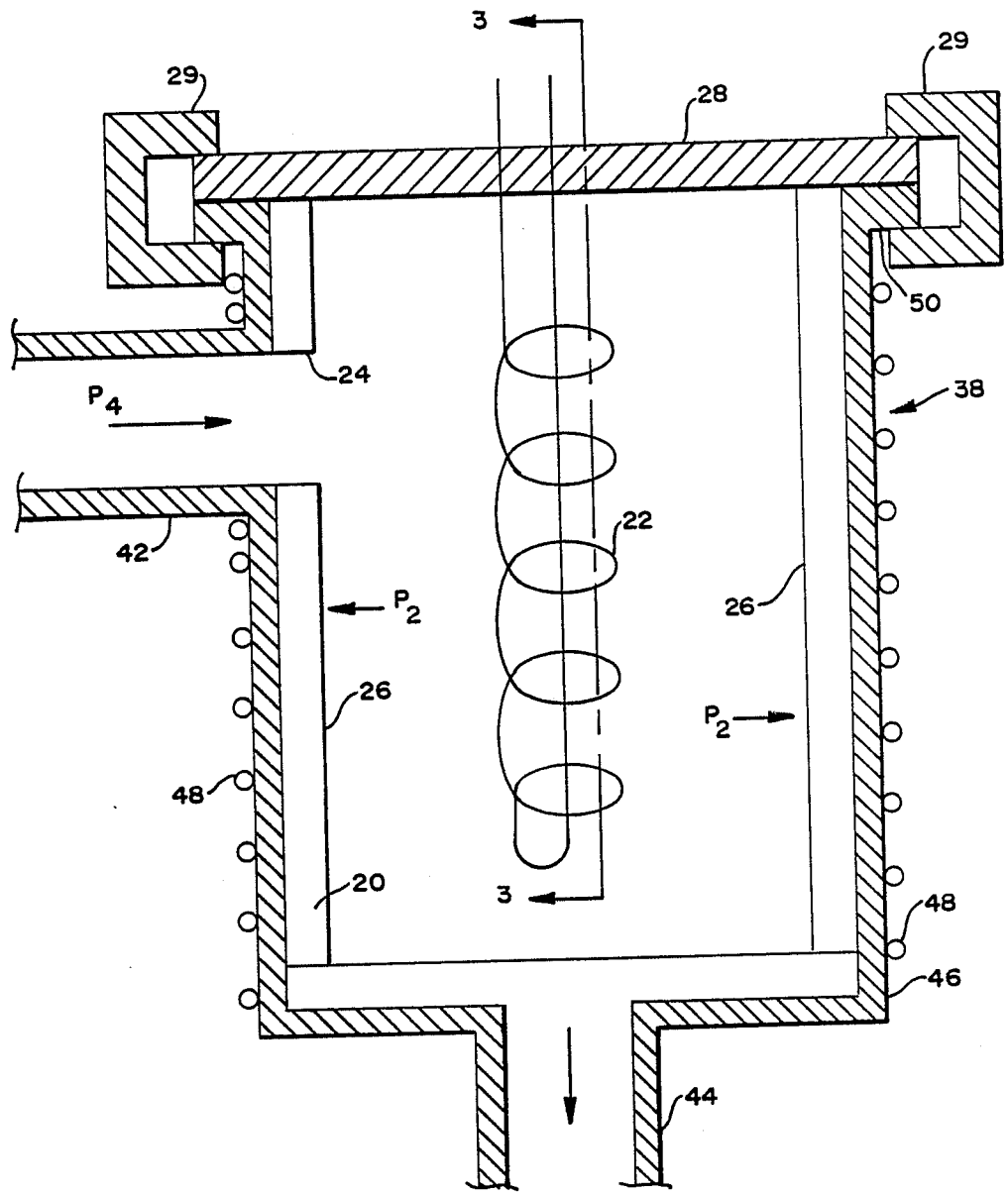
FIG. 2 is a cross-sectional view of the pnictide trap of the vacuum system of FIG. 1; and, FIG. 3 is a partial cross-sectional view of the removable and replaceable portion of the pnictide trap of FIG. 2.

Now, referring to FIG. 2, the pnictide trap of the invention is connected between outlet pipe 42, from the diffusion pump 36 (FIG. 1), and to the supply pipe 44 to the mechanical forepump 40 (FIG. 1).

The pnictide trap 38 comprises a cylndrical body 46 of stainless steel, for example, cooled by water cooling lines 48 in intimate contact therewith.

Cylindrical body 46 is provided with an annular collar 50 surrounding an opening at the top. A removable cylindrical sleeve 20 fits in this opening. Sleeve 20 fits in heat conductive contact with body 46, so that it is cooled by the water cooling lines 48.

The sleeve 20 is provided with an opening 24 to the pipe 42 through which $P_4$ species enter into the trap 38. A heated filament 22 is mounted to the cover plate 28 by means of an appropriate feed throughs (not shown). The filament is preferably heated to above 1000° C. to cause cracking of a significant portion of the $P_4$ species to $P_2$ which then sticks to the inner wall 26 of the sleeve 20 in the form of a phosphorus film.

For more information concerning the operation of the cracker 22, see the above-identified pending application of John A. Baumann and David G. Brock entitled VACUUM EVAPORATED FILMS OF CATENATED PHOSPHORUS MATERIAL, Ser. No. 509,159, filed June 29, 1983, now U.S. Pat. No. 4,596,721. That application is incorporated by reference herein.

Figure 3:
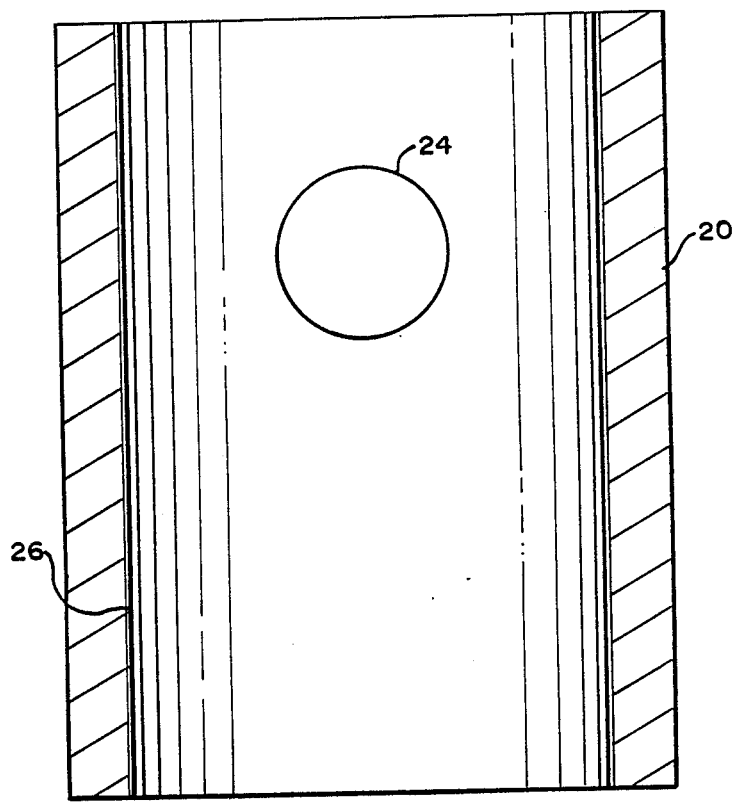

As shown in FIG. 2, the coverplate 28 may be removed together with the filament 22 by removing the clamps 29. The cylindrical sleeve 20 (FIG. 3) may then be removed and replaced, after cleaning or by a new sleeve.

The trap comprising the sleeve 20 and the filament 22 may be placed in the vacuum chamber 32 as at 60 to trap pnictides therein. This will reduce the buildup of pnictide coating inside the chamber 32 and lengthen its usage time between cleanings and reduce the background $Pnictide_4$ pressure when required.

The invention is useful for pnictides whose $Pnictide_4$ species has a low sticking coefficient and whose cracked species, such as $Pnictide_2$, have a high sticking coefficient. The invention may be also applied to other gases in vacuum systems which have a low sticking coefficient until cracked.

It is particularly important to trap pnictides before they get into the forepump as they are very deleterious to its operation.

Any suitable cracker or cracking method may be employed, such as a plasma which may be provided by a glow discharge. The input pipe 42 directs the uncracked species to the cracker 22. Having the exit pipe 44 orthogonal to inlet pipe 42 insures that more of the cracked species is directed to the walls and that most of the uncracked species encounter the cracker before it can exit through pipe 44.

It will thus be seen that the object set forth above among those made apparent by the preceding description, are efficiently attained and since certain changes may be made in the above method and in the construction set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A method for removing $pnictide_4$ vapor species from a vacuum system including a vacuum chamber coupled in fluid flow relationship to a forepump by a vacuum line for preventing said $pnictide_4$ species from entering said forepump, said method including the steps of:

providing a housing upstream from said forepump, causing said $pnictide_4$ vapor species to flow through said housing, cracking said $pnictide_4$ vapor species into $pnictide_2$ in said housing, maintaining at least one wall of said housing at a temperature at which said cracked $pnictide_2$ adheres to and forms a film on said at least one wall.

2. The method of claim 1 further including the step of positioning said housing in said vacuum chamber.

3. The method of claim 1 further including the step of positioning said housing in said vacuum line between said vacuum chamber and said forepump.

4. The method of claim 1 further including the step of removing said at least one wall from said housing to remove said film therefrom.

5. The method of claim 1 wherein said $pnictide_4$ vapor species is $P_4$.

6. The method of claim 1 wherein said $pnictide_4$ vapor species is cracked by a heated filament.

7. A method of removing gas from a vacuum system including the steps of:

cracking said gas to a form having a higher sticking coefficient than the uncracked gases, and causing said cracked gas to flow against a surface having a temperature at which said cracked gas condenses so that said cracked gas adheres to and forms a film on said surface.

8. The method of claim 7 wherein said gases are $pnictide_4$ vapor species.

9. The method of claim 8 wherein said gases are $P_4$.

10. The method of claim 7 wherein said gases are cracked by a heated filament.

11. The method of claim 7 wherein said gases are cracked within a vacuum chamber.

12. The method of claim 11 wherein said cracked gases are condensed on at least one wall of said vacuum chamber.

13. The method of claim 7 wherein said gases are cracked in a vacuum line coupled to a vacuum chamber.

14. The method of claim 13 wherein said cracked gases are condensed in said vacuum line coupled to said vacuum chamber.

15. A method of removing gas from a vacuum system including a vacuum chamber coupled in fluid flow relationship to at least one vacuum line, said method including:
cracking said gas in said vacuum chamber to a form having a higher sticking coefficient than the uncracked gas,
causing said cracked gas to flow against a first surface having a temperature at which said cracked gas condenses so that said cracked gas adheres to and forms a film on said surface,
causing any uncracked gas to flow through said vacuum line,
cracking said uncracked gas in said vacuum line, and
condensing said cracked gas on a second surface in said vacuum line maintained at a temperature at which said cracked gas adheres to and forms a film on said second surface.

16. The method of claim 15 wherein said first surface is a wall of said vacuum chamber.

17. The method of claim 15 wherein said first and second surfaces are removable.

18. The method of claim 15 wherein said gas is a pnictide$_4$ vapor species.

19. The method of claim 18 wherein said gas is $P_4$.

20. The method of claim 15 wherein said gas is cracked by a heated filament.

* * * * *